(12) United States Patent
Chandler et al.

(10) Patent No.: US 9,822,734 B2
(45) Date of Patent: Nov. 21, 2017

(54) TANDEM THRUST REVERSER WITH MULTI-BAR LINKAGE

(71) Applicant: United Technologies Corporation, Hartford, CT (US)

(72) Inventors: Jesse M. Chandler, South Windsor, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 484 days.

(21) Appl. No.: 14/184,368

(22) Filed: Feb. 19, 2014

(65) Prior Publication Data

US 2015/0121839 A1 May 7, 2015

Related U.S. Application Data

(60) Provisional application No. 61/768,166, filed on Feb. 22, 2013, provisional application No. 61/768,154, (Continued)

(51) Int. Cl.
*F02K 1/72* (2006.01)
*F02K 1/60* (2006.01)
(Continued)

(52) U.S. Cl.
CPC ............... *F02K 1/72* (2013.01); *B23P 19/04* (2013.01); *B64D 29/00* (2013.01); *F02K 1/60* (2013.01);
(Continued)

(58) Field of Classification Search
CPC ..... F02K 1/72; F02K 1/763; F02K 1/60; F02K 1/605; F02K 1/62; F02K 1/64; F05D 2260/50
See application file for complete search history.

(56) References Cited

U.S. PATENT DOCUMENTS 2,282,552 A 5/1942 Banowetz
2,526,791 A 10/1950 Wroblewski
(Continued)

FOREIGN PATENT DOCUMENTS

EP 0515263 B1 8/1994
EP 0756078 A1 1/1997
(Continued)

OTHER PUBLICATIONS

International Search Report and Written Opinion dated Dec. 17, 2014 for International Application No. PCT/US2014/022955.

*Primary Examiner* — Andrew Nguyen
(74) *Attorney, Agent, or Firm* — Kinney & Lange, P.A.

(57) ABSTRACT

One embodiment includes a pivot thrust reverser. The pivot thrust reverser includes a first tandem pivot door subassembly comprising an inner panel and an outer panel. The inner panel and the outer panel are connected so as to rotate simultaneously about respective pivot axes that are each positionally fixed axes relative to the gas turbine engine assembly. A second tandem pivot door subassembly is included, spaced from the first tandem pivot door subassembly and comprising an inner panel and an outer panel. The inner panel and the outer panel are connected so as to rotate simultaneously about respective pivot axes that are each positionally fixed axes relative to the gas turbine engine assembly.

20 Claims, 6 Drawing Sheets

Related U.S. Application Data filed on Feb. 22, 2013, provisional application No. 61/768,160, filed on Feb. 22, 2013, provisional application No. 61/768,171, filed on Feb. 22, 2013, provisional application No. 61/768,172, filed on Feb. 22, 2013.

(51) Int. Cl.

| | | |
|---|---|---|
| *F02K 1/62* | (2006.01) | |
| *F02K 1/64* | (2006.01) | |
| *B64D 29/00* | (2006.01) | |
| *B23P 19/04* | (2006.01) | |
| *F02K 1/76* | (2006.01) | |

(52) U.S. Cl.
CPC ............... *F02K 1/605* (2013.01); *F02K 1/62* (2013.01); *F02K 1/64* (2013.01); *F02K 1/763* (2013.01); *F05D 2260/50* (2013.01); *Y10T 29/49229* (2015.01)

(56) References Cited

U.S. PATENT DOCUMENTS

| | | | |
|---|---|---|---|
| 3,067,968 A | 12/1962 | Heppenstall | |
| 3,601,992 A * | 8/1971 | Maison | F02K 1/70 239/265.19 |
| 3,614,037 A * | 10/1971 | Vdolek | F02K 1/36 239/265.13 |
| 3,699,682 A | 10/1972 | Kleckner | |
| 4,196,856 A | 4/1980 | James | |
| 4,278,220 A | 7/1981 | Johnston et al. | |
| 4,410,152 A | 10/1983 | Kennedy et al. | |
| 4,442,987 A | 4/1984 | Legrand et al. | |
| 4,485,970 A | 12/1984 | Fournier et al. | |
| 4,825,644 A | 5/1989 | Bubello et al. | |
| 4,894,985 A | 1/1990 | Dubois et al. | |
| 4,920,744 A | 5/1990 | Garcia et al. | |
| 4,960,243 A | 10/1990 | Dubois et al. | |
| 5,039,171 A | 8/1991 | Lore | |
| 5,090,197 A | 2/1992 | Dubois | |
| 5,110,069 A | 5/1992 | Webb | |
| 5,117,630 A | 6/1992 | Cariola et al. | |
| 5,267,438 A * | 12/1993 | Bunel | F02K 1/70 239/265.29 |
| 5,315,821 A | 5/1994 | Dunbar et al. | |
| 5,497,961 A | 3/1996 | Newton | |
| 5,609,313 A | 3/1997 | Cole et al. | |
| 5,642,960 A | 7/1997 | Salice | |
| 5,722,231 A * | 3/1998 | Porte | F02K 1/70 239/265.29 |
| 5,863,014 A | 1/1999 | Standish | |
| 5,941,061 A | 8/1999 | Sherry et al. | |
| 5,970,704 A | 10/1999 | Lardy et al. | |
| 5,974,783 A | 11/1999 | Gonidec et al. | |
| 6,079,201 A * | 6/2000 | Jean | F02K 1/70 239/265.29 |
| 6,151,884 A | 11/2000 | Gonidec et al. | |
| 6,170,255 B1 * | 1/2001 | Gonidec | F02K 1/70 60/226.2 |
| 6,179,249 B1 | 1/2001 | Canadas | |
| 6,293,495 B1 | 9/2001 | Aten et al. | |
| 6,296,495 B1 | 10/2001 | Wang et al. | |
| 6,340,135 B1 | 1/2002 | Barton | |
| 6,568,172 B2 | 5/2003 | Jannetta et al. | |
| 6,688,099 B2 | 2/2004 | Lair | |
| 6,786,038 B2 * | 9/2004 | Lair | B64D 33/06 181/213 |
| 6,968,675 B2 | 11/2005 | Ramlaoui et al. | |
| 7,127,880 B2 | 10/2006 | Lair et al. | |
| 7,484,356 B1 | 2/2009 | Lair | |
| 7,784,735 B2 | 8/2010 | Marche | |
| 7,784,765 B2 | 8/2010 | Ichikawa et al. | |
| 7,959,106 B2 | 6/2011 | Guibert et al. | |
| 7,959,107 B2 | 6/2011 | Beaufort | |
| 8,002,217 B2 | 8/2011 | Sternberger | |
| 8,015,797 B2 | 9/2011 | Lair | |
| 8,052,085 B2 | 11/2011 | Lair | |
| 8,091,827 B2 | 1/2012 | Lair | |
| 8,172,175 B2 | 5/2012 | Lair | |
| 8,181,905 B2 | 5/2012 | McDonough et al. | |
| 8,220,738 B2 | 7/2012 | Calder et al. | |
| 8,226,027 B2 | 7/2012 | Journade et al. | |
| 8,418,436 B2 | 4/2013 | Pero et al. | |
| 8,951,006 B2 | 2/2015 | Vauchel et al. | |
| 9,188,026 B2 | 11/2015 | Calder et al. | |
| 2003/0218094 A1 | 11/2003 | Lair | |
| 2005/0039438 A1 * | 2/2005 | Lair | F02K 1/763 60/226.2 |
| 2005/0084325 A1 | 4/2005 | O'Brien et al. | |
| 2005/0151012 A1 * | 7/2005 | Lair | F02K 1/70 244/110 B |
| 2006/0288688 A1 | 12/2006 | Lair | |
| 2008/0072570 A1 | 3/2008 | Lair | |
| 2008/0098720 A1 | 5/2008 | Watson | |
| 2008/0302083 A1 | 12/2008 | Sloan et al. | |
| 2009/0260344 A1 | 10/2009 | Hoyland | |
| 2009/0288386 A1 | 11/2009 | Marshall et al. | |
| 2009/0313969 A1 | 12/2009 | Lair et al. | |
| 2010/0008772 A1 | 1/2010 | Vauchel et al. | |
| 2010/0107599 A1 | 5/2010 | Vauchel | |
| 2010/0139242 A1 | 6/2010 | Vauchel et al. | |
| 2010/0170984 A1 | 7/2010 | Journade et al. | |
| 2010/0270428 A1 | 10/2010 | Murphy | |
| 2011/0101159 A1 * | 5/2011 | Lair | F02K 1/60 244/110 B |
| 2011/0167790 A1 | 7/2011 | Cloft et al. | |
| 2011/0318173 A1 | 12/2011 | Ramlaoui et al. | |
| 2012/0005999 A1 | 1/2012 | Pero et al. | |
| 2012/0067024 A1 | 3/2012 | Vauchel | |
| 2012/0067975 A1 | 3/2012 | Vauchel | |
| 2012/0073263 A1 | 3/2012 | Kohlenberg et al. | |
| 2012/0325930 A1 | 12/2012 | Pero et al. | |
| 2013/0216297 A1 | 8/2013 | Albach | |
| 2013/0219002 A1 | 8/2013 | Li et al. | |
| 2014/0239083 A1 | 8/2014 | Suciu et al. | |
| 2014/0239084 A1 | 8/2014 | Chandler et al. | |
| 2015/0121839 A1 | 5/2015 | Chandler et al. | |

FOREIGN PATENT DOCUMENTS

| | | |
|---|---|---|
| EP | 0756557 B1 | 5/1998 |
| EP | 0728934 B1 | 5/1999 |
| EP | 0761947 B1 | 5/2000 |
| EP | 0771945 B1 | 1/2001 |
| EP | 0789140 B1 | 11/2001 |
| EP | 0822327 B1 | 8/2003 |
| EP | 2399827 A2 | 12/2011 |
| EP | 1507971 B1 | 1/2012 |
| EP | 1676024 B1 | 10/2012 |
| WO | WO9528318 A1 | 10/1995 |
| WO | WO03100241 A1 | 12/2003 |
| WO | WO2007123556 A2 | 11/2007 |
| WO | WO2011014346 A2 | 2/2011 |

\* cited by examiner

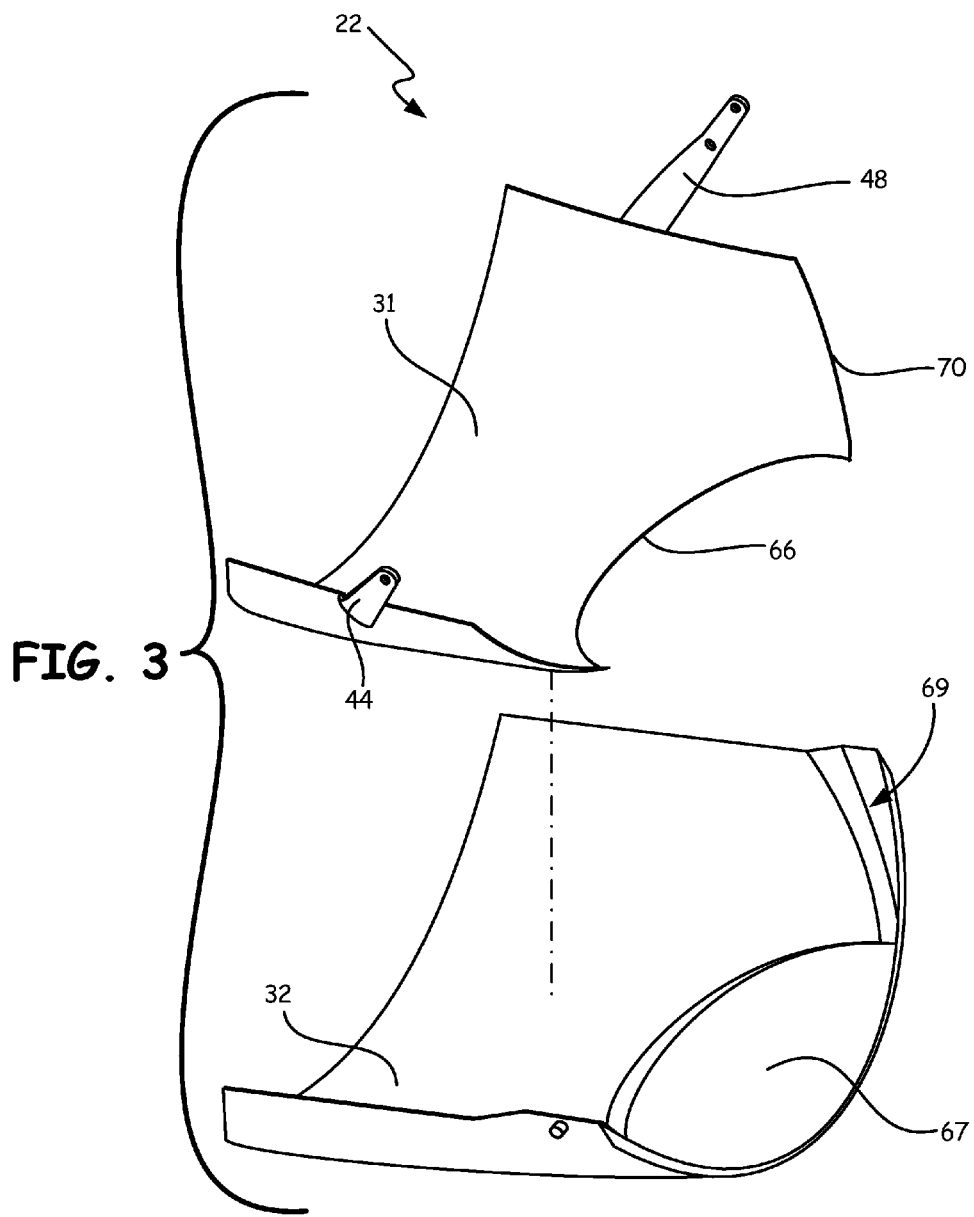

TANDEM THRUST REVERSER WITH MULTI-BAR LINKAGE

CROSS-REFERENCE TO RELATED APPLICATION(S)

The present application claims priority to U.S. Provisional Patent Application Ser. No. 61/768,166, entitled "ATR TANDEM THRUST REVERSER WITH 4-BAR LINKAGE," filed Feb. 22, 2013, which is hereby incorporated by reference in its entirety. Priority is also claimed to U.S. Provisional Patent Application Ser. Nos. 61/768,154, entitled "ATR PIVOT THRUST REVERSER WITH CONTOURING AROUND CORE," filed Feb. 22, 2013; 61/768,160, entitled "ATR TANDEM THRUST REVERSER," filed Feb. 22, 2013; 61/768,171, entitled "ATR CONTOURED THRUST REVERSER WITH 3 POINT ACUATION," filed Feb. 22, 2013; and 61/768,172, entitled "AIR TANDEM THRUST REVERSER WITH 3 POINT ACTUATION," filed Feb. 22, 2013. All of these are hereby incorporated by reference in their entirety.

BACKGROUND

The presently disclosed embodiments relate generally to gas turbine engine and/or nacelle assemblies and, more particularly, to thrust reversers used in gas turbine engine and/or nacelle assemblies.

Thrust reversers in gas turbine engine and/or nacelle assemblies are deployed to redirect an aircraft's propulsive air flow, such as in a forward direction rather than aft. This can provide deceleration for the aircraft which, for example, can assist in slowing the aircraft down during landing, and therefore, enable shorter landing distances while reducing stress and wear on an aircraft's brakes. Thrust reversers are particularly useful when a landing surface is icy or wet, and consequently, the aircraft's brakes are less effective.

Commercial gas turbine engines typically include an engine which produces high temperature, high pressure exhaust ejected through a nozzle downstream of the engine, and a bypass duct, which is generally an annular space concentrically located about the engine through which air from the engine fan, known as the fan bypass stream, is passed. Many aircraft applications use high bypass ratio gas turbine engines, where a majority of the aircraft's propulsion is provided by the fan bypass stream, rather than by the exhaust produced from the engine. In such applications, a thrust reverser may be able to operate effectively by redirecting the fan bypass stream alone.

However, providing a thrust reverser to redirect the fan bypass stream presents design challenges. The thrust reverser must be part of an overall aerodynamic design when stowed, yet be capable of effectively deploying at an appropriate angle which captures enough of the fan bypass stream, and redirects this fan bypass stream at the needed angle, to provide deceleration. Achieving this can be complicated due to stationary portions of the nacelle, which can serve as an obstruction to the thrust reverser when attempting to move to the deployed position. To obtain thrust reverser designs which provide the necessary deceleration and avoid nacelle interference, complex assemblies with a multitude of parts have generally been used, often requiring translating parts relative to the engine to allow the thrust reverser to deploy at an effective location without nacelle interference. These designs also have generally included an obstruction present in the fan bypass stream reversal flow path, such as actuators or linkages. Moreover, these complex designs are less reliable and require greater maintenance costs. Even with these complex designs, significant portions of the fan bypass stream are not redirected, resulting in a less efficient thrust reverser and, as a consequence, the need for longer landing distances and increased wear on the aircraft's brakes.

SUMMARY

One embodiment includes a pivot thrust reverser. The pivot thrust reverser includes a first tandem pivot door subassembly comprising an inner panel and an outer panel. The inner panel and the outer panel are connected so as to rotate simultaneously about respective pivot axes that are each positionally fixed axes relative to the gas turbine engine assembly. A second tandem pivot door subassembly is included, spaced from the first tandem pivot door subassembly and comprising an inner panel and an outer panel. The inner panel and the outer panel are connected so as to rotate simultaneously about respective pivot axes that are each positionally fixed axes relative to the gas turbine engine assembly.

Another embodiment includes a method for use in a gas turbine engine. A first tandem pivot door subassembly is provided comprising an inner panel and an outer panel. The inner panel and the outer panel of the first tandem pivot door subassembly are connected to allow the inner panel and the outer panel to rotate simultaneously about different pivot axes. The first tandem pivot door subassembly is pivotally deployed from a stowed position to a deployed position by an actuator on respective pivot axes each positionally fixed relative to the gas turbine engine.

BRIEF DESCRIPTION OF THE DRAWINGS

FIG. 3 is an exploded perspective view of an inner panel and outer panel of a tandem pivot door subassembly.

Figure 1A:
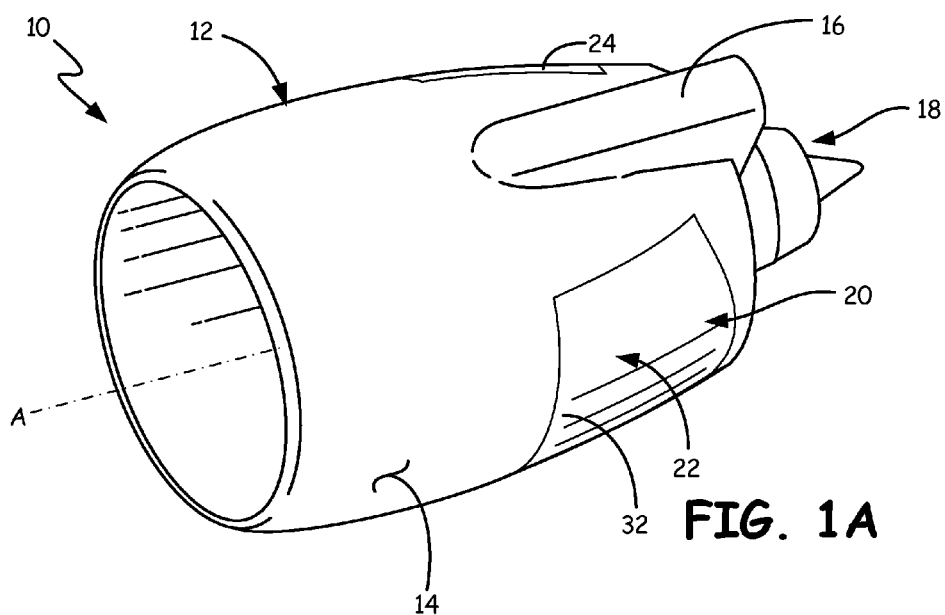
FIG. 1A is a perspective view of an embodiment of a gas turbine engine and nacelle assembly with a pivot thrust reverser according to the present invention, shown in a stowed position.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Generally, a pivot thrust reverser can be deployed to surround a portion of a gas turbine engine inner bypass duct wall such that a fan bypass stream is interrupted and redirected with relatively little leakage, while a core stream and a nacelle ventilation stream are unobstructed or substantially unobstructed. To avoid interference with the nacelle, the pivot thrust reverser uses a tandem pivot door subassembly with an inner panel and an outer panel that rotate simultaneously about different pivot points to allow the tandem pivot door subassembly to deploy and surround the inner surface of the bypass duct. When stowed, the pivot thrust reverser tandem pivot door subassembly makes up a portion of both a surface of a bypass duct (e.g., an outer duct wall) and an outer surface of a nacelle. The thrust reverser tandem pivot door subassembly can be pivotally deployed from a stowed position to a deployed position by a single actuator on pivot axes that are positionally fixed relative to the gas turbine engine.

Figure 1B:
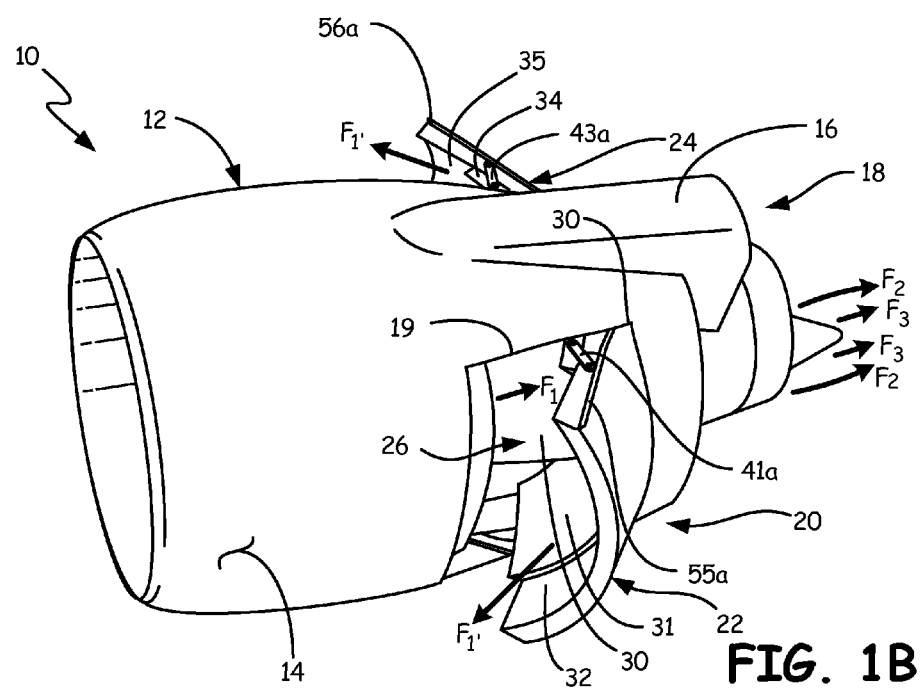
FIG. 1B is a perspective view of the gas turbine engine and nacelle assembly of FIG. 1A with the pivot thrust reverser shown in a deployed position.
Figure 1C:
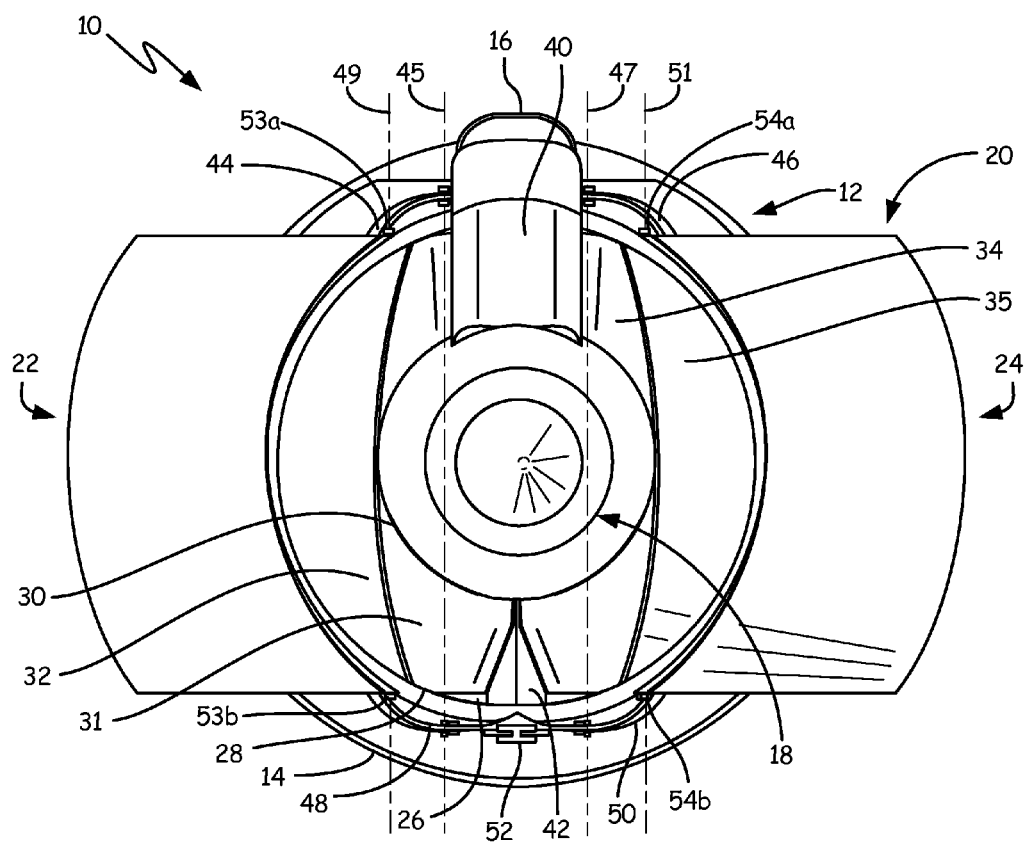
FIG. 1C is an aft elevation view of the gas turbine engine and nacelle assembly of FIG. 1B.

FIGS. 1A, 1B, and 1C show an embodiment of gas turbine engine and nacelle assembly 10. FIG. 1A is a perspective view of assembly 10 with pivot thrust reverser 20 in the stowed position. FIG. 1B shows a perspective view of assembly 10 with pivot thrust reverser 20 in a deployed position. FIG. 1C is an aft elevation view of assembly 10 shown with pivot thrust reverser 20 in the deployed position. Assembly 10 includes nacelle 12, outer surface 14 of nacelle 12, pylon 16, engine 18, nacelle opening 19, pivot thrust reverser 20 with first tandem pivot door subassembly 22 and second tandem pivot door subassembly 24, bypass duct 26, outer surface 28 and inner surface 30 of bypass duct 26, inner panel 31 and outer panel 32 of first tandem pivot door subassembly 22, inner panel 34 and outer panel 35 of second tandem pivot door subassembly 24, upper bifurcation (bi-fi) fairing 40, lower bi-fi fairing 42, linkages 44 and 48 of first tandem pivot door subassembly 22, linkages 46 and 50 of second tandem pivot door subassembly 24, pivot axis 45 of inner panel 31, pivot axis 47 of inner panel 34, pivot axis 49 of outer panel 32, pivot axis 51 of outer panel 35, actuator 52, fixed pivot connection points 53a and 53b, fixed pivot connection points 54a and 54b, fan bypass stream $F_1$, redirected fan bypass stream $F_1$, nacelle ventilation stream $F_2$, and core stream $F_3$. Certain components of assembly 10, such as a fan of engine 18, have been omitted for simplicity. Nacelle 12 provides an annular housing within which a substantial portion of engine 18 is located. Engine 18 is aligned on axis A of assembly 10 in the illustrated embodiment. Engine 18 includes a compressor section, a combustor section, and a turbine section (those sections not specifically shown), which in combination produce hot combustion gases that provide operational energy for engine 18. Pylon 16 provides a means for mounting assembly 10 to an aircraft (not shown). Pivot thrust reverser 20 includes both first tandem pivot door subassembly 22 and second tandem pivot door subassembly 24. As shown here, second tandem pivot door subassembly 24 is spaced approximately 180° from first tandem pivot door subassembly 22 relative to axis A of assembly 10.

When stowed, as shown in FIG. 1A, first tandem pivot door subassembly 22 and second tandem pivot door subassembly 24 each form a portion of outer surface 14, such that outer surface 14 is substantially smooth at all points along an exterior of nacelle 12, including interfaces with first tandem pivot door subassembly 22 and second tandem pivot door subassembly 24. Because first tandem pivot door subassembly 22 and second tandem pivot door subassembly 24 provide a smooth outer surface 14 of nacelle 12, pivot thrust reverser 20 tends to reduce a risk of undesired aerodynamic concerns.

Inner surface 30 of bypass duct 26 provides an outer surface of a wall covering engine 18. Bypass duct 26 is defined by the annular space within nacelle 12 between inner surface 30 and outer surface 28 of bypass duct 26. Outer surface 28 of bypass duct 26 is formed by a duct wall at the interior of nacelle 12, and first tandem pivot door subassembly 22 and second tandem pivot door subassembly 24 when in the stowed position, as shown in FIG. 1A. In this embodiment, inner panel 31 and outer panel 32 of first tandem pivot door subassembly 22 are connected by a multi-bar linkage (further described with regard to FIG. 2A). Inner panel 34 and outer panel 35 of second tandem pivot door subassembly 24 are also connected by another multi-bar linkage (further described with regard to FIG. 2A). In other embodiments, the connection between inner panels 31 and 34 and outer panels 32 and 35 can be made by differing numbers and configurations of linkages, or other types of mechanisms, as desired for particular applications.

Both first tandem pivot door subassembly 22 and second tandem pivot door subassembly 24 can pivot on respective pivot axes that are each positionally fixed relative to their respective mounting locations. Thus, first tandem pivot door subassembly 22 and second tandem pivot door subassembly 24 can merely pivot into the deployed position, without requiring any translation of portions of nacelle 12, first tandem pivot door subassembly 22, or second tandem pivot door subassembly 24. Both first tandem pivot door subassembly 22 and second tandem pivot door subassembly 24 pivot into opening 19 so as to open upstream from an aft end of nacelle 12, such that first tandem pivot door subassembly 22 and second tandem pivot door subassembly 24 pivot open inside of nacelle 12, obstructing flow through bypass duct 26.

Fan bypass stream $F_1$ is relatively cold air which enters through the fan at the front end of nacelle 12 and passes through bypass duct 26. When pivot thrust reverser 20 is in the stowed position, fan bypass stream $F_1$ exits from an aft end of nacelle 12 and can provide a majority of the propulsion generated by high bypass gas turbine engine 18. However, when pivot thrust reverser 20 is in the deployed position, as shown in FIGS. 1B and 1C, first tandem pivot door subassembly 22 and second tandem pivot door subassembly 24 open inside of nacelle 12 and obstruct at least a portion of the flow of fan bypass stream $F_1$ through bypass duct 26, such that a redirected fan bypass stream $F_1$ no longer exits from the aft end of nacelle 12, but is instead diverted in another direction. Redirected fan bypass stream $F_1$ is redirected by deployed pivot thrust reverser 20 to flow in the forward, or upstream, direction shown in FIGS. 1B and 1C. Importantly, pivot thrust reverser 20 is configured such that there need not be any actuators, linkages, or other obstructions present in $F_1$ flow path when pivot thrust reverser 20 is in the deployed position, which could otherwise obstruct the flow of redirected fan bypass stream $F_1$ in the forward direction, thus reducing the effectiveness of pivot thrust reverser 20. Redirecting fan bypass stream $F_1$ as shown can restrict or prevent fan bypass stream $F_1$ from providing forward propulsion, but can also actively provide deceleration. Yet, nacelle ventilation stream $F_2$ and core stream $F_3$, which flow through the inside of engine 18, can remain substantially unobstructed and continue to flow out downstream of engine 18 when pivot thrust reverser 20 is deployed in substantially the same manner as when pivot thrust reverser 20 is in the stowed position.

In the illustrated embodiment, outer panel 32 is larger than inner panel 31 of first tandem pivot door subassembly 22 and outer panel 35 is larger than inner panel 34 of second tandem pivot door subassembly 24. However, inner panels 31 and 34 and outer panels 32 and 35 can be any combination of sizes, with the relevant configurations adjusted and opening 19 sized accordingly. By using larger outer panels 32 and 35 as shown, outer panels 32 and 35 not only provide structural support to inner panels 31 and 34 respectively, but also take on functional roles. Larger outer panels 32 and 35 provide additional guidance, in addition to the guidance provided by inner panels 31 and 34, for redirecting fan bypass stream $F_1$ in the appropriate forward direction needed to provide deceleration. Consequently, by further guiding redirected fan bypass stream $F_1$ in the forward direction, pivot thrust reverser 20 operates more effectively. Furthermore, larger outer panels 32 and 35 also can function as an air break, and thus provide deceleration in addition to that provided by redirected fan bypass stream $F_1$.

Engine 18 is centered inside nacelle 12, in the illustrated embodiment, and thus is axially aligned with the engine fan at the front end of nacelle 12 (axis A of FIG. 1A). Upper bi-fi fairing 40 and lower bi-fi fairing 42 serve to interconnect nacelle 12 and engine 18, as well as provide additional stiffness for nacelle 12 and space for wires, tubes and other similar components.

In the illustrated embodiment, as best shown in FIG. 1C, linkage 44 provides a hinged connection between inner panel 31 (of first tandem pivot door subassembly 22) and pivot axis 45, with linkage 44 fixed to nacelle 12 at pivot axis 45. In the same manner, linkage 46 provides a hinged connection between inner panel 34 (of second tandem pivot door subassembly 24) and pivot axis 47, with linkage 46 fixed to nacelle 12 at pivot axis 47. Pivot axis 45 of inner panel 31 and pivot axis 47 of inner panel 34 can be positionally fixed relative to assembly 10, nacelle 12, and/or engine 18. Pivot axis 45 is spaced from inner panel 31 and extends from linkage 44 to linkage 48. Similarly, pivot axis 47 is spaced from inner panel 34 and extends from linkage 46 to linkage 50. Linkage 48 provides a connection between inner panel 31 and actuator 52, while linkage 50 provides a connection between inner panel 34 and actuator 52.

Outer panel 32 (of first tandem pivot door subassembly 22) is fixed to nacelle 12 at fixed pivot connection points 53a and 53b, and pivots about pivot axis 49. Points 53a and 53b provide hinge points for outer panel 32 and are located at or near a perimeter of outer panel 32 in nacelle 12, between outer surface 14 of nacelle 12 and outer surface 28 of bypass duct 26, on pivot axis 49. Outer panel 35 (of second tandem pivot door subassembly 24) is fixed to nacelle 12 at fixed pivot connection points 54a and 54b, and pivots about pivot axis 51. Points 54a and 54b provide hinge points for outer panel 35 and are located at or near a perimeter of outer panel 35 in nacelle 12, between outer surface 14 of nacelle 12 and outer surface 28 of bypass duct 26, on pivot axis 51. Pivot axis 49 of outer panel 32 and pivot axis 51 of outer panel 35 can each be positionally fixed relative to assembly 10, nacelle 12, and/or engine 18. Pivot axis 49 extends from point 53a to point 53b. Pivot axis 51 extends from point 54a to point 54b. As shown and discussed throughout, inner panels 31 and 34 can maintain connection with outer panels 32 and 35 by multi-bar linkages 41 and 43. As a result, inner panel 31 and outer panel 32 of first tandem pivot door subassembly 22 can pivot simultaneously about different pivot axes 45 and 49 without translating relative to those axes 45 and 49. Similarly, inner panel 34 and outer panel 35 of second tandem pivot door subassembly 24 can pivot simultaneously about different pivot axes 47 and 51 without translating.

Actuator 52 pivots both first tandem pivot door subassembly 22 and second tandem pivot door subassembly 24 from the stowed position to the deployed position without translation of first tandem pivot door subassembly 22, second tandem pivot door subassembly 24, or any portion of nacelle 12. In the deployed position shown in FIGS. 1B and 1C, first tandem pivot door subassembly 22 and second tandem pivot door subassembly 24 circumferentially surround inner surface 30 of bypass duct 26. Inner panel 31 of first tandem pivot door subassembly 22 and inner panel 34 of second tandem pivot door subassembly 24 are each configured to circumferentially surround inner surface 30 of bypass duct 26 such that an at least partially sealing, mating relationship is formed and there is relatively little leakage of fan bypass stream $F_1$ (the only leakage coming from portions where bypass duct 26 is visible). This means that nearly all of fan bypass stream $F_1$ is redirected, resulting in a highly efficient pivot thrust reverser 20. Yet, at the same time entire pivot thrust reverser 20 can be deployed by a single actuator 52, and therefore, provides a simplified design requiring minimal parts, and thus increases reliability and reduces maintenance costs.

Figure 2A:
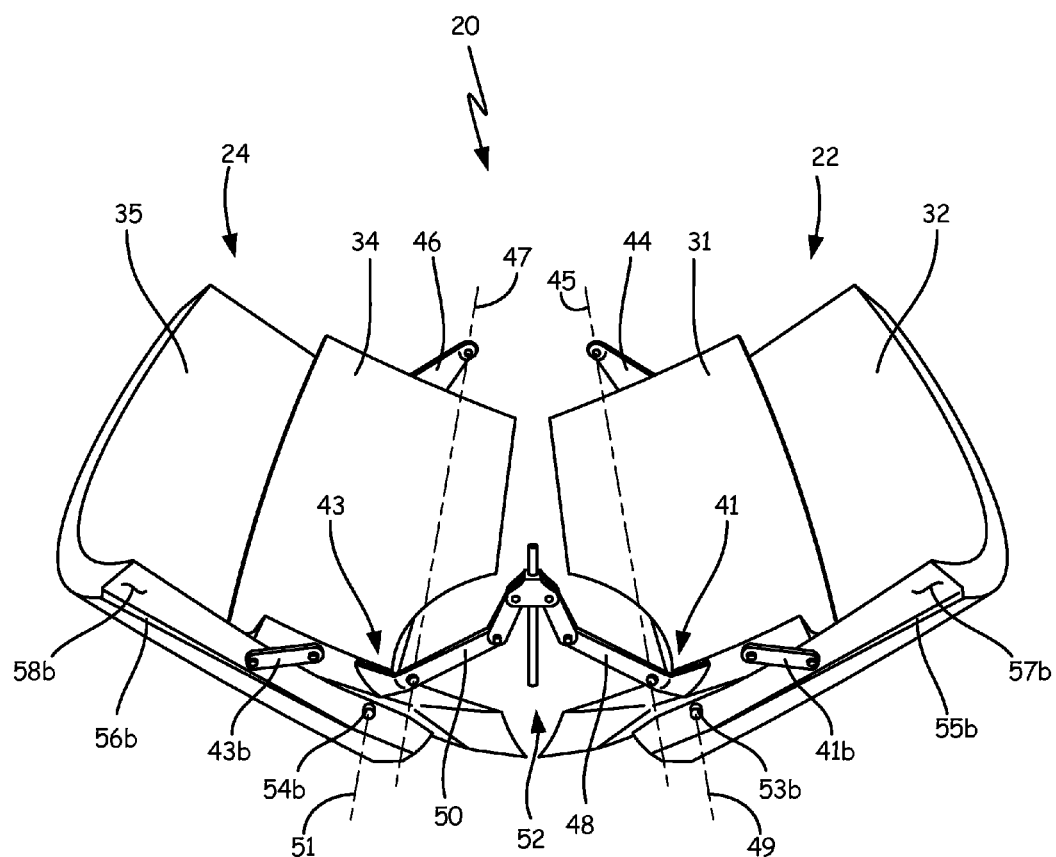
FIG. 2A is a perspective view of the pivot thrust reverser, with a single actuator, in the deployed position showing the inner panels connected to the outer panels by multi-bar linkages.
Figure 2B:
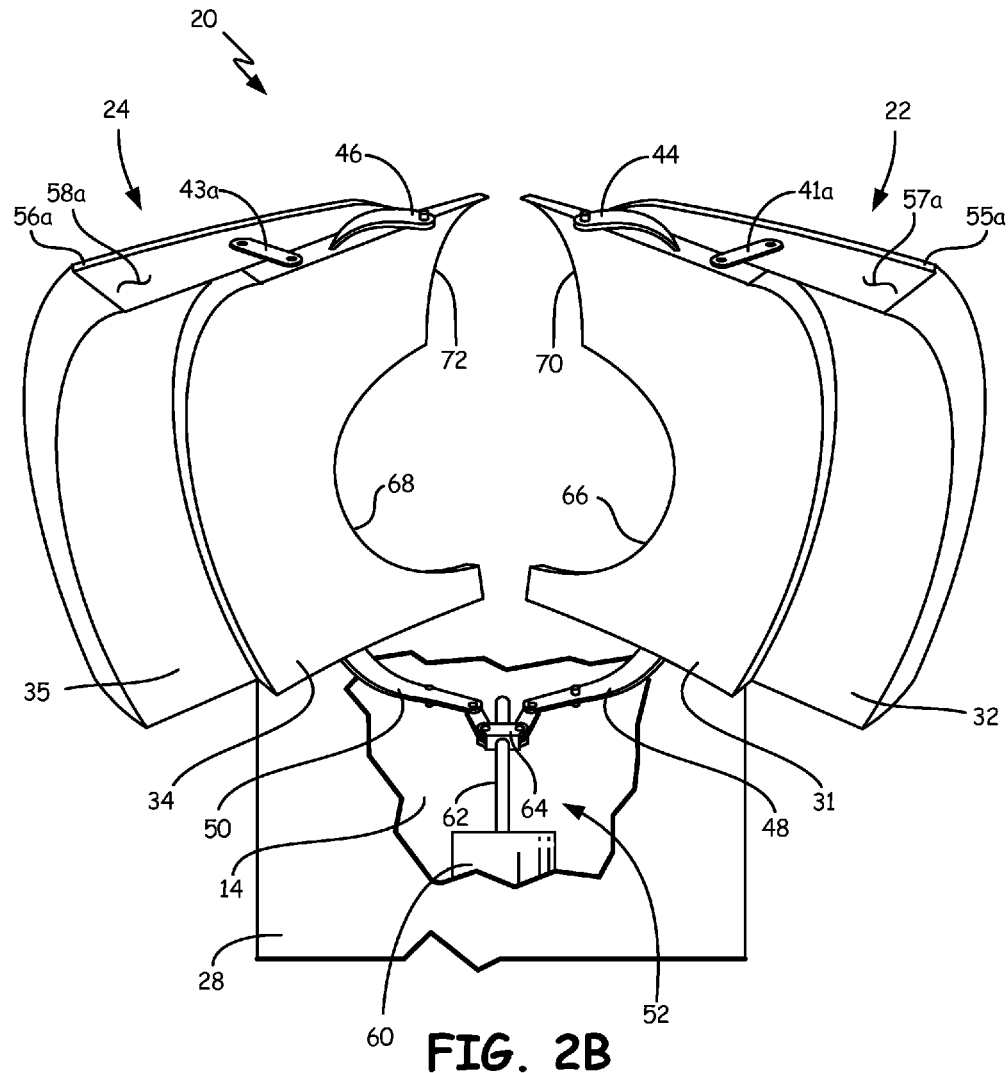
FIG. 2B is another perspective view of the pivot thrust reverser and single actuator of FIG. 2A.

FIGS. 2A and 2B show pivot thrust reverser 20, with a single actuator 52, in a deployed position. FIG. 2A shows a perspective view with a bottom of pivot thrust reverser 20 visible. FIG. 2B shows a perspective view with a top of pivot thrust reverser 20 visible. Certain assembly 10 components are left out for simplicity. Included, in addition to that shown and described previously, are top link 41a and bottom link 41b of first tandem pivot door subassembly 22, top link 43a and bottom link 43b of second tandem pivot door subassembly 24, top overhang 55a and bottom overhang 55b of outer panel 32 of first tandem pivot door subassembly 22, top overhang 56a and bottom overhang 56b of outer panel 35 of second tandem pivot door subassembly 24, multi-bar linkage 41 of first tandem pivot door subassembly 22, multi-bar linkage 43 of second tandem pivot door subassembly 24, surfaces 57a and 57b of outer panel 32 of first tandem pivot door subassembly 22, surfaces 58a and 58b of outer panel 35 of second tandem pivot door subassembly 24, motor 60, threaded rod 62, threaded knucklehead 64, cutouts 66 and 68, and aft edges 70 and 72.

Multi-bar linkage 41 can include link 41a, link 41b, and linkage 48. Linkage 48 provides a connection between inner panel 31 and actuator 52, while links 41a and 41b provide a connection between inner panel 31 and outer panel 32. Similarly, multi-bar linkage 43 can include link 43a, link 43b, and linkage 50. Linkage 50 provides a connection between inner panel 31 and actuator 52, while links 43a and 43b provide a connection between inner panel 34 and outer panel 35. In other embodiments, multi-bar linkages 41 and 43 could include alternate and/or additional connections between actuator 52, inner panels 31 and 34, and/or outer panels 32 and 35, respectively. Overhangs 55a and 55b of outer panel 32 extend out over surfaces 57a and 57b, providing coverage of links 41a and 41b respectively when pivot thrust reverser 20 is in the stowed position. Overhangs 56a and 56b of outer panel 35 extend out over surfaces 58a and 58b, providing coverage of links 43a and 43b when pivot thrust reverser 20 is in the stowed position. Thus, overhangs 55a, 55b, 56a, and 56b help alleviate aerodynamic concerns of nacelle 12 when pivot thrust reverser 20 is stowed.

Actuator 52 is located between outer surface 28 of bypass duct 26 and outer surface 14 of nacelle 12 (see also FIG. 1C). Actuator 52 can be, for example, a bolt screw linear actuator as shown here that includes motor 60, threaded rod 62, and threaded knucklehead 64. However, various other types of actuators can also be used in alternate embodiments to pivot both first tandem pivot door subassembly 22 and second tandem pivot door subassembly 24 between the stowed and deployed positions. Motor 60 moves threaded knucklehead 64 down threaded rod 62 towards motor 60, and in so doing, pivots inner panel 31 on pivot axis 45. Then, due to the connection between inner panel 31 and outer panel 32 by multi-bar linkage 41, outer panel 32 is simultaneously made to pivot on pivot axis 49. At the same time, inner panel 34 is also pivoted on pivot axis 47, and due to the connection between inner panel 34 and outer panel 32 by multi-bar linkage 43, outer panel 35 is simultaneously made to pivot on pivot axis 51. In this manner, first tandem pivot door subassembly 22 and second tandem pivot door subassembly 24 are pivoted by single actuator 52 about different pivot axes between stowed and deployed positions without translating (relative to assembly 10).

Additionally, inner panel 31 of first tandem pivot door subassembly 22 contains cutout 66 in aft edge 70 and inner panel 34 of second tandem pivot door subassembly 24 contains cutout 68 in aft edge 72. Both cutouts 66 and 68 are located on lower portions of aft edges 70 and 72 respectively. When in the deployed position, as shown here, aft edge 70 of inner panel 31 faces aft edge 72 of inner panel 34. As a result, cutout 66 is aligned to face cutout 68 when tandem pivot door subassemblies 22 and 24 are deployed, forming an opening in pivot thrust reverser 20 to accommodate engine 18. Both cutout 66 and cutout 68 can be arc-shaped, resulting in the opening in pivot thrust reverser 20 being generally circular in shape. However, in alternative embodiments, cutouts 66 and 68 can have various different shapes and be placed at any location on inner panels 31 and 34. Also, when deployed, aft edges 70 and 72 of inner panels 31 and 34 extend longitudinally beyond aft edges of outer panels 32 and 35, such that aft edges 70 and 72 do not have outer panels 32 and 35 located directly behind them.

FIG. 3 is an exploded perspective view of inner panel 31 and outer panel 32 of first tandem pivot door subassembly 22. Included, in addition to that shown and described previously, are inward-facing protrusion 67 and side protrusion 69 on outer panel 32. Inner panel 31 is placed on top of outer panel 32, with links 41a and 41b then added to provide the connection between inner panel 31 and outer panel 32. When connected and stowed, aft edge 70 of inner panel 31 extends only up to where side protrusion 69 begins, such that side protrusion 69 at an aft edge of outer panel 32 extends longitudinally beyond aft edge 70. In this embodiment, inward-facing protrusion 67 is of a shape complimentary with cutout 66 in aft edge 70 of inner panel 31, such that inward-facing protrusion 67 protrudes into the location of cutout 66 when inner panel 31 is placed on top of outer panel 32. Also, side protrusion 69 is of a shape complimentary with curved aft edge 70 of inner panel 31, such that side protrusion 69 protrudes up from an interface of aft edge 70 and side protrusion 69. Protrusions 67 and 69 then allow first tandem pivot door subassembly 22 to both provide a substantially smooth outer surface 28 of bypass duct 26 (see FIG. 1C) and a complete outer surface 14 of nacelle 12 when first tandem pivot door subassembly 22 is stowed (see FIG. 1A). Consequently, fan bypass stream $F_1$ experiences relatively little turbulence when passing through bypass duct 26 at the location where outer surface 28 of bypass duct 26 is formed by stowed first tandem pivot door subassembly 22. This allows assembly 10 to produce efficient and effective propulsion even with pivot thrust reverser 20 included in assembly 10.

Figure 4A:
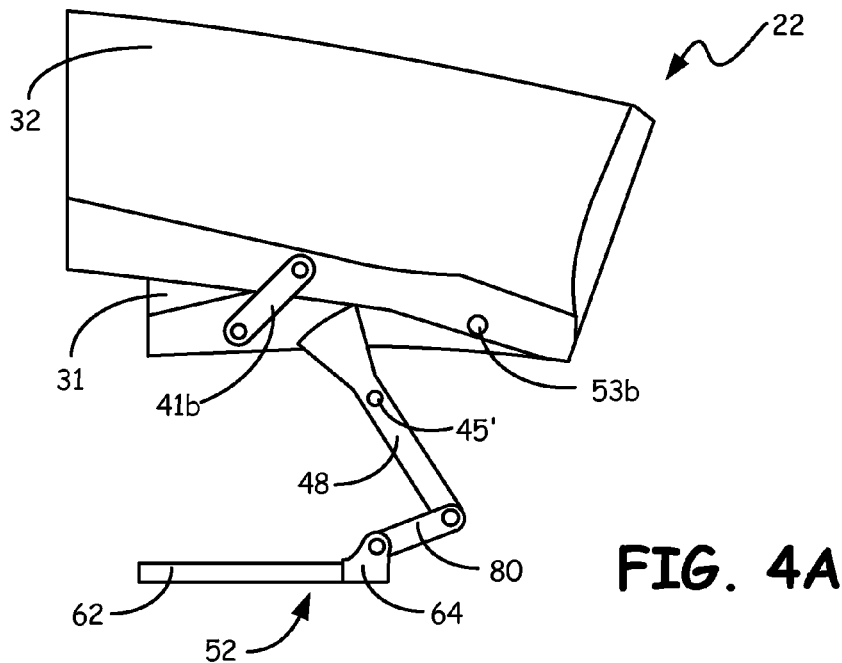
FIG. 4A is a plan view of the tandem pivot door subassembly, shown in isolation, in the stowed position.
Figure 4B:
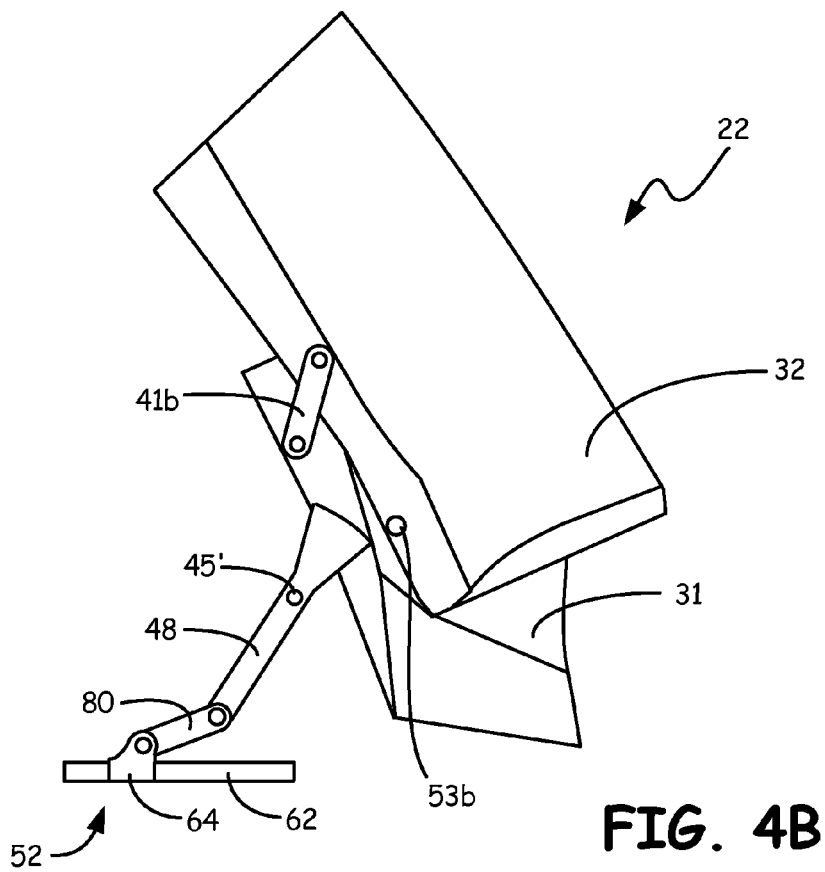
FIG. 4B is a plan view of the tandem pivot door subassembly, shown in isolation, in the deployed position.

FIGS. 4A and 4B show a plan view of actuator 52 and first tandem pivot door subassembly 22 in isolation, with first tandem pivot door subassembly 22 pivoted from the stowed to the deployed position. FIG. 4A shows first tandem pivot door subassembly 22 in the stowed position. FIG. 4B shows first tandem pivot door subassembly 22 pivoted to the deployed position. Included, in addition to that shown and described previously, are fixed pivot point 45 and link 80. Fixed pivot point 45 is located on pivot axis 45 (shown in FIG. 1C) and is a pivot connection point about which inner panel 31 rotates. Point 53b, as discussed for FIG. 1C, is located on pivot axis 49, and is a pivot connection point about which outer panel 32 is hinged to nacelle 12 and pivotally rotates. In this embodiment, point 53b is located at or near a perimeter of outer panel 32, and more specifically is at or near an aft end of outer panel 32 which can pivot inside of nacelle 12. Link 80 provides a connection between threaded knucklehead 64 of actuator 52 and linkage 48.

As first tandem pivot door subassembly 22 is pivoted to the deployed position, threaded knucklehead 64 moves down threaded rod 62. This forces inner panel 31 to pivot about pivot axis 45 on point 45, and in turn, due to the connection between inner panel 31 and outer panel 32 by links 41a (shown in FIG. 2B) and 41b, forces outer panel 32 to pivot about pivot axis 49 on point 53b. Thus, pivoting of inner panel 31 results also in pivoting of outer panel 32. Outer panel 32 is held in the position shown in FIG. 4B due to point 53b being fixed to nacelle 12. Therefore, first tandem pivot door subassembly 22 is deployed by pivoting inner panel 31 and outer panel 32 simultaneously about different pivot points. This allows first tandem pivot door subassembly 22 to deploy and avoid interference from nacelle 12 that otherwise would occur due to the location of first tandem pivot door subassembly 22.

The present embodiments provide a highly effective thrust reverser for use in a gas turbine engine. This is because configuring inner panels 31 and 34 with cutouts 66 and 68 to surround inner surface 30 of bypass duct 26 as shown allows nearly all of fan bypass stream $F_1$ to be redirected in the appropriate direction, while at the same time minimizing the number of components needed to pivot both first and second tandem pivot door subassemblies 22 and 24 from the stowed to the deployed position without interference from nacelle 12. This is turn decreases the weight of thrust reverser 20 while increasing the reliability of thrust reverser 20. Additionally, the design of thrust reverser 20 provides a modular assembly which allows for direct mounting of thrust reverser 20 in position.

Discussion of Possible Embodiments

The following are non-exclusive descriptions of possible embodiments of the present invention.

A pivot thrust reverser comprising a first tandem pivot door subassembly comprising an inner panel and an outer panel. The inner panel and the outer panel are connected so as to rotate simultaneously about respective pivot axes that are each positionally fixed axes relative to the gas turbine engine assembly. Also included is a second tandem pivot door subassembly spaced from the first tandem pivot door subassembly and comprising an inner panel and an outer panel. The inner panel and the outer panel are connected so as to rotate simultaneously about respective pivot axes that are each positionally fixed axes relative to the gas turbine engine assembly.

The pivot thrust reverser of the preceding paragraph can optionally include, additionally and/or alternatively, any one or more of the following features, configurations, and/or additional components:

An actuator configured to pivot both the first tandem pivot door subassembly and the second tandem pivot door subassembly from a stowed position to a deployed position. The actuator is located between a surface of a bypass duct and an outer surface of a nacelle.

In a deployed position the first tandem pivot door subassembly and the second tandem pivot door subassembly circumferentially surround an inner surface of a bypass duct such that when the pivot thrust reverser is deployed during engine operation a fan bypass stream is redirected while both a core stream and a nacelle ventilation stream flow in the same manner as when the pivot thrust reverser is stowed.

The inner panel and the outer panel of the first tandem pivot door subassembly are connected by a multi-bar linkage.

An overhang on each of two surfaces of the outer panel of the first tandem pivot door subassembly.

The inner panel and the outer panel of the second tandem pivot door subassembly are connected by a multi-bar linkage.

The pivot point of the inner panel of the first tandem pivot door subassembly is located on a linkage operatively connected between an actuator and the inner panel of the first tandem pivot door subassembly. The pivot point of the outer panel of the first tandem pivot door subassembly is located at or near a perimeter of the outer panel of the first tandem pivot door subassembly.

When the first tandem pivot door subassembly is in the stowed position an aft edge of the outer panel substantially extends longitudinally beyond an aft edge of the inner panel, but when the first tandem pivot door subassembly is in the deployed position the aft edge of the inner panel substantially extends longitudinally beyond the aft edge of the outer panel.

A method for use in a gas turbine engine, the method comprising providing a first tandem pivot door subassembly comprising an inner panel and an outer panel. The inner panel is connected to the outer panel of the first tandem pivot door subassembly to allow the inner panel and the outer panel to rotate simultaneously about different pivot axes. The first tandem pivot door subassembly is pivotally deployed from a stowed position to a deployed position by an actuator, wherein the inner and outer panels are pivotally deployed by the actuator on respective pivot axes each positionally fixed relative to the gas turbine engine.

The method of the preceding paragraph can optionally include, additionally and/or alternatively, the following techniques, steps, features and/or configurations:

Providing a second tandem pivot door subassembly spaced from the first tandem pivot door subassembly comprising an inner panel and an outer panel. The inner panel and the outer panel of the second tandem pivot door subassembly are connected to allow the inner panel and the outer panel to rotate simultaneously about different pivot axes. The second tandem pivot door subassembly is pivotally deployed from a stowed position to a deployed position by an actuator. The inner and outer panels are pivotally deployed by the actuator on respective pivot axes each positionally fixed relative to the gas turbine engine.

Circumferentially surrounding an inner surface of a bypass duct with the first tandem pivot door subassembly and the second tandem pivot door subassembly when the first tandem pivot door subassembly and the second tandem pivot door subassembly are in the deployed position; and redirecting a fan bypass stream during engine operation when the first tandem pivot door subassembly and the second tandem pivot door subassembly are in the deployed position.

Locating the first tandem pivot door subassembly in a location such that the first tandem pivot door subassembly forms both a portion of a surface of a bypass duct and a portion of an outer surface of a nacelle when in a stowed position; and locating the second tandem pivot door subassembly in a location such that the second tandem pivot door subassembly forms both a portion of the surface of the bypass duct and a portion of the outer surface of the nacelle when in a stowed position.

The inner panel and the outer panel of the first tandem pivot door subassembly, and the inner panel and the outer panel of the second tandem pivot door subassembly are connected by a multi-bar linkage.

A pivot thrust reverser comprising a first tandem pivot door subassembly comprising an inner panel with an aft edge, an outer panel with an aft edge, and a connection between the inner panel and the outer panel; a second tandem pivot door subassembly comprising an inner panel with an aft edge, an outer panel with an aft edge, and a connection between the inner panel and the outer panel, and wherein when the first tandem pivot door subassembly and the second tandem pivot door subassembly are in a deployed position the aft edge of the first tandem pivot door subassembly inner panel faces the aft edge aft edge of the second tandem pivot door subassembly inner panel and the aft edge of the first tandem pivot door subassembly outer panel faces the aft edge of the second tandem pivot door subassembly outer panel; a first cutout on the first tandem pivot door subassembly inner panel; and a second cutout on the second tandem pivot door subassembly inner panel.

Both the first cutout and the second cutout are arc-shape.

An inward-facing protrusion on both the first tandem pivot door subassembly outer panel and the second tandem pivot door subassembly outer panel. The inward-facing protrusions are of a shape complementary with the first and second cutouts.

A linkage of the first tandem pivot door subassembly and a linkage of the second tandem pivot door subassembly each in connection with an actuator which pivots the first tandem pivot door subassembly and the second tandem pivot door subassembly on axes that are positionally fixed.

The first tandem pivot door subassembly outer panel is larger than the first tandem pivot door subassembly inner panel and the second tandem pivot door subassembly outer panel is larger than the second tandem pivot door subassembly inner panel.

The connection between the inner panel and the outer panel of the first tandem pivot door subassembly and the connection between the inner panel and the outer panel of the second tandem pivot door subassembly is made by a multi-bar linkage.

An overhang on each of two surfaces of the outer panel of the first tandem pivot door subassembly.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

Furthermore, terms such as "top," "upper," "bottom," and "lower" are used in a relative sense, and it should be acknowledged that assembly 10 can have many orientations during use, such as when utilized on an aircraft. Such aircraft uses can also include mounting assembly 10 such that thrust reverser 20 can deploy horizontally, vertically, or any angles in between.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pivot thrust reverser for use in a gas turbine engine assembly, the pivot thrust reverser comprising:
    a first tandem pivot door subassembly comprising an inner panel and an outer panel, wherein the inner panel and the outer panel are connected so as to rotate simultaneously about respective pivot axes that are each positionally fixed axes relative to the gas turbine engine assembly and the inner panel is entirely radially inward from the outer panel when the first tandem pivot door subassembly is in a stowed position;
    a linkage having a first end operatively connected to an actuator and a second end operatively connected to the inner panel of the first tandem pivot door subassembly;
    a pivot point located on the linkage between the first end and the second end, the inner panel of the first tandem pivot door subassembly being rotatable about the pivot point, wherein the pivot axis of the inner panel passes through the pivot point; and
    a second tandem pivot door subassembly spaced from the first tandem pivot door subassembly and comprising an inner panel and an outer panel, wherein the inner panel and the outer panel are connected so as to rotate simultaneously about respective pivot axes that are each positionally fixed axes relative to the gas turbine engine assembly and the inner panel is entirely radially inward from the outer panel when the second tandem pivot door subassembly is in the stowed position.

2. The pivot thrust reverser of claim 1, wherein the actuator is configured to pivot both the first tandem pivot door subassembly and the second tandem pivot door subassembly from the stowed position to a deployed position, and wherein the actuator is located between a surface of a bypass duct and an outer surface of a nacelle.

3. The pivot thrust reverser of claim 1, wherein in a deployed position the first tandem pivot door subassembly and the second tandem pivot door subassembly circumferentially surround an inner surface of a bypass duct such that when the pivot thrust reverser is deployed during engine operation a fan bypass stream is redirected while both a core stream and a nacelle ventilation stream flow in the same manner as when the pivot thrust reverser is stowed.

4. The pivot thrust reverser of claim 1, wherein the inner panel and the outer panel of the first tandem pivot door subassembly are connected by a multi-bar linkage.

5. The pivot thrust reverser of claim 4, further comprising an overhang on each of two surfaces of the outer panel of the first tandem pivot door subassembly.

6. The pivot thrust reverser of claim 4, wherein the inner panel and the outer panel of the second tandem pivot door subassembly are connected by a multi-bar linkage.

7. The pivot thrust reverser of claim 1, wherein the outer panel of the first tandem pivot door subassembly is rotatable about an outer panel pivot point that is located at or near a perimeter of the outer panel of the first tandem pivot door subassembly.

8. The pivot thrust reverser of claim 1, wherein when the first tandem pivot door subassembly is in the stowed position an aft edge of the outer panel of the first tandem pivot door subassembly substantially extends longitudinally beyond an aft edge of the inner panel of the first tandem pivot door subassembly, but when the first tandem pivot door subassembly is in a deployed position the aft edge of the inner panel of the first tandem pivot door subassembly substantially extends longitudinally beyond the aft edge of the outer panel of the first tandem pivot door subassembly.

9. A method for use with a gas turbine engine, the method comprising:
    providing a first tandem pivot door subassembly comprising an inner panel and an outer panel entirely radially outward from the inner panel when the first tandem pivot door subassembly is in a stowed position;
    connecting the inner panel and the outer panel of the first tandem pivot door subassembly to allow the inner panel and the outer panel to rotate simultaneously about different pivot axes; and
    pivotally deploying the first tandem pivot door subassembly from the stowed position to a deployed position by an actuator, wherein the inner and outer panels are pivotally deployed by the actuator on respective pivot axes each positionally fixed relative to the gas turbine engine, and wherein the inner panel is rotatable about a pivot point located on a linkage between a first end that is operatively connected to the actuator and a second end that is operatively connected to the inner panel, and wherein the pivot axis of the inner panel passes through the pivot point.

10. The method of claim 9, further comprising:
    providing a second tandem pivot door subassembly spaced from the first tandem pivot door subassembly comprising an inner panel and an outer panel entirely radially outward from the inner panel of the second tandem pivot door subassembly when the second tandem pivot door subassembly is in the stowed position; and
    connecting the inner panel and the outer panel of the second tandem pivot door subassembly to allow the inner panel and the outer panel of the second tandem pivot door subassembly to rotate simultaneously about different pivot axes; and
    pivotally deploying the second tandem pivot door subassembly from the stowed position to the deployed position by the actuator, wherein the inner and outer panels of the second tandem pivot door subassembly are pivotally deployed by the actuator on respective pivot axes each positionally fixed relative to the gas turbine engine.

11. The method of claim 10, further comprising:
circumferentially surrounding a portion of an inner surface of a bypass duct with the first tandem pivot door subassembly and the second tandem pivot door subassembly when the first tandem pivot door subassembly and the second tandem pivot door subassembly are in the deployed position; and
redirecting a fan bypass stream during engine operation when the first tandem pivot door subassembly and the second tandem pivot door subassembly are in the deployed position.

12. The method of claim 11, further comprising:
locating the first tandem pivot door subassembly in a location such that the first tandem pivot door subassembly forms both a first portion of an outer surface of the bypass duct and a first portion of an outer surface of a nacelle when in the stowed position; and
locating the second tandem pivot door subassembly in a location such that the second tandem pivot door subassembly forms both a second portion of the outer surface of the bypass duct and a second portion of the outer surface of the nacelle when in the stowed position.

13. The method of claim 10, wherein the inner panel and the outer panel of the first tandem pivot door subassembly are connected by a first multi-bar linkage, and the inner panel and the outer panel of the second tandem pivot door subassembly are connected by a second multi-bar linkage.

14. A pivot thrust reverser comprising:
a first tandem pivot door subassembly comprising an inner panel with an aft edge, an outer panel with an aft edge, and a connection between the inner panel and the outer panel, wherein the inner panel and the outer panel rotate simultaneously about respective pivot axes that are each positionally fixed axes relative to a gas turbine engine, wherein the inner panel is entirely radially inward from the outer panel when the first tandem pivot door subassembly is in a stowed position, the inner panel is rotatable about a first pivot point located on a first linkage operatively connected between an actuator and the inner panel of the first tandem pivot door subassembly, and the first pivot point is located on the first linkage between a first end and a second end and wherein the pivot axis of the inner panel passes through the first pivot point;
a second tandem pivot door subassembly comprising an inner panel with an aft edge, an outer panel with an aft edge, and a connection between the inner panel and the outer panel, and wherein the inner panel is entirely radially inward from the outer panel when the second tandem pivot door subassembly is in the stowed position and when the first tandem pivot door subassembly and the second tandem pivot door subassembly are in a deployed position the aft edge of the first tandem pivot door subassembly inner panel faces the aft edge of the second tandem pivot door subassembly inner panel and the aft edge of the first tandem pivot door subassembly outer panel faces the aft edge of the second tandem pivot door subassembly outer panel;
a first cutout on the first tandem pivot door subassembly inner panel; and
a second cutout on the second tandem pivot door subassembly inner panel.

15. The pivot thrust reverser of claim 14, wherein both the first cutout and the second cutout are arc-shape.

16. The pivot thrust reverser of claim 14, further comprising an inward-facing protrusion on both the first tandem pivot door subassembly outer panel and the second tandem pivot door subassembly outer panel, wherein the inward-facing protrusions are of a shape complementary with the first and second cutouts.

17. The pivot thrust reverser of claim 14, further comprising a second pivot point of the inner panel of the second tandem pivot door subassembly that is located on a second linkage operatively connected between the actuator and the inner panel of the second tandem pivot door subassembly with the second pivot point being located on the second linkage between a first end and a second end.

18. The pivot thrust reverser of claim 14, wherein the first tandem pivot door subassembly outer panel is larger than the first tandem pivot door subassembly inner panel and the second tandem pivot door subassembly outer panel is larger than the second tandem pivot door subassembly inner panel.

19. The pivot thrust reverser of claim 14, wherein the connection between the inner panel and the outer panel of the first tandem pivot door subassembly and the connection between the inner panel and the outer panel of the second tandem pivot door subassembly is made by a multi-bar linkage.

20. The pivot thrust reverser of claim 19, further comprising an overhang on each of two surfaces of the outer panel of the first tandem pivot door subassembly.

* * * * *